(12) United States Patent
Piscaer et al.

(10) Patent No.: US 8,230,778 B2
(45) Date of Patent: Jul. 31, 2012

(54) APPARATUS FOR PREPARING AND DISPENSING BEVERAGES WHICH MAY OR MAY NOT BE AT LEAST PARTLY FOAMED

(75) Inventors: Petrus Josephus Carolus Piscaer, Rotterdam (NL); Hendrikus Christinus Maria Wessels, Uithoorn (NL)

(73) Assignee: Koninklijke Douwe Egberts B.V. (NL)

( * ) Notice: Subject to any disclaimer, the term of this patent is extended or adjusted under 35 U.S.C. 154(b) by 973 days.

(21) Appl. No.: 11/885,465

(22) PCT Filed: Mar. 3, 2006

(86) PCT No.: PCT/NL2006/000113
§ 371 (c)(1),
(2), (4) Date: Jul. 2, 2008

(87) PCT Pub. No.: WO2006/093406
PCT Pub. Date: Sep. 8, 2006

(65) Prior Publication Data
US 2009/0107342 A1    Apr. 30, 2009

(30) Foreign Application Priority Data

Mar. 4, 2005 (NL) .................................... 1028460

(51) Int. Cl.
*A23F 3/00* (2006.01)
(52) U.S. Cl. .................................. 99/323.1; 99/323.3
(58) Field of Classification Search .............. 99/323, 99/323.3, 282, 283, 279, 280, 289 R, 286
See application file for complete search history.

(56) References Cited

U.S. PATENT DOCUMENTS

| 3,433,464 | A |   | 3/1969 | Swafford et al. |
|-----------|---|---|--------|-----------------|
| 3,450,024 | A |   | 6/1969 | Martin |
| 3,872,781 | A | * | 3/1975 | Helbling ..................... 99/282 |
| 4,694,740 | A |   | 9/1987 | Daloz |
| D297,098  | S | * | 8/1988 | Ohya et al. ................ D7/309 |

(Continued)

FOREIGN PATENT DOCUMENTS

DE    40 37 366 A1    5/1992

(Continued)

OTHER PUBLICATIONS

International Search Report for PCT/NL2006/000113, date of mailing, May 31, 2006, 3 pages.

*Primary Examiner* — Mitra Aryanpour
(74) *Attorney, Agent, or Firm* — Foley & Lardner LLP

(57) ABSTRACT

The invention relates to an apparatus for preparing and dispensing a beverage such as coffee, tea, milk, chocolate milk, soup or the like, which beverage, if desired, may be at least partly foamed. To that end, the apparatus comprises a foaming chamber (3), provided with an inlet opening (4) for supply of beverage prepared upstream, an outlet opening (6) for dispensing the beverage, and foaming means (8) for foaming beverage fed through the foaming chamber, and dosing means (15) for regulating a beverage flow rate flowing from the foaming chamber (3). The foaming means (8) and outlet opening (6) are preferably displaceable relative to each other, so that the foaming means can close off or clear this opening at least partly and can thus function as dosing means (15). The foaming means (8) can for comprise, for instance, a drive shaft (9, 20) with paddles (10).

29 Claims, 10 Drawing Sheets

U.S. PATENT DOCUMENTS

| | | | |
|---|---|---|---|
| 5,103,716 A * | 4/1992 | Mikkelsen | 99/289 R |
| 5,158,793 A * | 10/1992 | Helbling | 99/283 |
| 5,192,002 A * | 3/1993 | Reese et al. | 222/108 |
| 5,265,519 A | 11/1993 | Schiettecatte et al. | |
| 5,490,447 A * | 2/1996 | Giuliano | 99/286 |
| 5,549,036 A * | 8/1996 | Hourizadeh | 99/286 |
| 5,638,740 A | 6/1997 | Cai | |
| 5,676,040 A * | 10/1997 | Ford | 99/280 |
| 5,803,320 A * | 9/1998 | Cutting et al. | 222/641 |
| 5,839,610 A * | 11/1998 | Reese et al. | 222/129.3 |
| 5,913,962 A | 6/1999 | Gasser et al. | |
| 6,009,792 A | 1/2000 | Kraan | |
| 6,499,689 B1 | 12/2002 | Miyazaki | |
| 6,769,352 B2 | 8/2004 | de Bruin et al. | |
| 6,784,850 B2 | 8/2004 | Morooka et al. | |
| 6,840,158 B2 | 1/2005 | Cai | |
| 7,726,233 B2 * | 6/2010 | Kodden et al. | 99/323 |
| 2005/0183578 A1 * | 8/2005 | Mandralis et al. | 99/279 |
| 2007/0039476 A1 * | 2/2007 | Kodden | 99/279 |
| 2007/0062378 A1 * | 3/2007 | Glucksman et al. | 99/279 |
| 2008/0223217 A1 * | 9/2008 | Teller et al. | 99/280 |
| 2009/0158937 A1 * | 6/2009 | Stearns et al. | 99/323.3 |
| 2009/0285966 A1 * | 11/2009 | Tso et al. | 222/129.3 |

FOREIGN PATENT DOCUMENTS

| | | |
|---|---|---|
| DE | 42 13 895 A1 | 11/1992 |
| GB | 989996 | 4/1965 |
| WO | WO 89/12416 A2 | 12/1989 |
| WO | WO 2004/056246 A1 | 7/2004 |

* cited by examiner

APPARATUS FOR PREPARING AND DISPENSING BEVERAGES WHICH MAY OR MAY NOT BE AT LEAST PARTLY FOAMED

CROSS-REFERENCE TO RELATED APPLICATIONS

The present application claims priority as a national stage application of International Patent Application Serial No. PCT/NL2006/000113 filed on Mar. 3, 2006; and The Netherlands Application Serial No. NL1028460 filed on Mar. 4, 2005, which are both hereby incorporated herein by reference in their entirety.

BACKGROUND

The invention relates to an apparatus for preparing and dispensing a beverage such as coffee, tea, milk, chocolate milk, soup, milkshakes or the like, which beverage, if desired, may be at least partly foamed, comprising a foaming chamber provided with an inlet opening for supplying beverage prepared upstream, an outlet opening for dispensing the beverage, and foaming means for foaming beverage fed through the foaming chamber.

Such an apparatus is known from practice. With it, as desired, unfoamed, or at least partly foamed beverages can be dispensed. However, a drawback of this known apparatus is that the foaming chamber limits the dispensing flow rate (herein defined as dispensed beverage volume per time unit) as the chamber is designed for foaming and dispensing, per preparation cycle, a measured quantity of beverage, tailored to one mug or cup. This is disadvantageous in particular when using such an apparatus in large-scale consumption environments such as an office, canteen, bar or hotel establishment, where larger quantities of beverage that may or may not be foamed, for instance a (thermos) jug, are required on a regular basis. With the known apparatus, this may lead to considerable waiting times.

The object of the invention is to provide an apparatus of the type described hereinabove, wherein the drawback mentioned of the known apparatus is obviated, while maintaining the advantages thereof. To that end, an apparatus according to the invention is characterized by the features of claim 1.

SUMMARY

By providing the apparatus with a dosing unit, with which a beverage flow rate flowing from the outlet and the average residence time of the beverage in the foaming chamber can be regulated, this flow rate can, each time, be adjusted to an amount of beverage requested by the consumer. When this requested amount is large, the flow rate may (temporarily) be increased, so that waiting times can be limited. It will then be clear that, if the foaming means are active, the quantity and/or the quality of the foam formed in the beverage will decrease according as the outgoing flow rate is increased, as the beverage will remain in the foaming chamber for a shorter period of time and, consequently, will be exposed to the foaming action thereof for a shorter period of time.

In particular, it applies that the dosing unit is provided with a constriction in a fluid communication between the foaming chamber and the outlet and a plug which can be moved to and fro in a direction of movement of the plug within at least a part of the fluid communication, so that the plug can be moved in a position wherein the plug closes off the fluid communication at the constriction, and the plug can be moved away from the constriction for releasing the fluid communication, at least partly. It appears that in this manner, the respective flow rate can be accurately regulated. In particular it applies here that a passage is formed between the plug and the fluid communication when the plug partly releases the fluid communication at the constriction. The split-shaped passage further has the advantage that when the foaming means are activated and air is whipped into the beverage in the foaming chamber, only air bubbles with a size smaller than a width of the split can arrive at the outlet intact. Larger bubbles will then be broken. The result is that an attractive fine-bubble foam layer can be obtained. Moreover, when the flow rate is increased through increase of the width of the split, the number of bubbles that can pass the split increases, resulting in that also at a larger flow rate, still, a rich amount of foam can be obtained when the foaming means are activated. Naturally, it is also possible not to activate the foaming means when it is not desirable to generate foam. Here, again, at wish, a small amount of beverage or a large amount of beverage can be dispensed.

If it is desired to prepare a large amount of beverage without foam, the foaming means can be deactivated and, moreover, the dosing unit can be controlled such that the beverage can flow from the outlet at a relatively large flow rate. If it is nevertheless desired that, here, the beverage is provided with a certain amount of foam, the foaming means can be activated.

If, on the other hand, it is intended that a small amount of beverage is dispensed, for instance one cup, which furthermore is provided with a rich amount of foam, on the one side, the foaming means can be activated and, on the other side, the dosing unit can be controlled in a manner such that, in use, the beverage flows from the outlet at a relatively small flow rate. The consequence hereof is that for the beverage, a residence time in the foaming chamber is longer than when the flow rate at which the beverage flows from the outlet is relatively large. Owing to the increased residence time, more foam can be whipped into the beverage.

Here, it is also possible that for a particular period of time, the dosing unit blocks the beverage flowing from the outlet. During this period, the beverage is, or the ingredients for the beverage are supplied to the foaming chamber. The result is that the foaming chamber will be gradually filled with the beverage while when the foaming means are activated, air is whipped into the beverage. When the foaming chamber is optimally filled for whipping in air, then, the dosing unit can be controlled such that beverage begins flowing from the outlet so that also, beverage will begin flowing from the foaming chamber. When, for instance simultaneously, beverage and/or ingredients for the beverage are still supplied to the foaming chamber, the foaming chamber will be provided for a long period of time with an amount of beverage which is optimal for whipping in air. When sufficient beverage is prepared, the supply of beverage to the foaming chamber can be terminated whereupon, eventually, the foaming chamber will empty via the outlet.

In particular it applies that the fluid communication is closed off from an environment of the apparatus. From a viewpoint of hygiene, it is highly advantageous that the fluid communication is closed off from the environment of the apparatus. In particular, it further applies that the apparatus is further provided with at least one beverage unit for supplying beverage or the ingredients of the beverage to the foaming chamber. In particular, it applies here that a flow path from the beverage unit to the outlet is designed to be closed off from the environment. In this manner, optimal hygiene is guaranteed for the beverage to be prepared.

In an advantageous embodiment, an apparatus according to the invention is characterized in that the foaming means can also function as dosing unit.

Through the use of the foaming means as dosing means (dosing unit), a highly effective and compact apparatus can be obtained, while the advantages mentioned hereinabove can be achieved with only a limited number of additional parts. When for instance a small beverage flow rate is desired, the foaming means can be used for partly blocking the outlet opening and/or for temporarily restraining through-flow of the foaming chamber, for instance, by diverting the beverage or bringing it to a swirl, while at the same time, air can be introduced into the beverage so as to foam it. If, however, a large amount of beverage is desired, the outgoing flow rate can be increased by, for instance, displacing and/or deforming the foaming means such that the outlet opening is completely cleared and/or through-flow is restrained as little as possible.

In a preferred embodiment, the foaming means can comprise a drive shaft arranged for rotation, provided with radially extending paddles. Owing to the rotating paddles, the beverage is foamed and obtains an airy, foamed structure. The quality and/or quantity of the foam can then be influenced by varying the rotational speed of the drive shaft. For instance, the rotational speed can be increased when the outgoing flow rate is increased, in order to thus sustain the formation of foam.

In a particularly advantageous embodiment, the dosing unit, at least its operation, can be coupled to the rotation of the drive shaft. This can be an electronic coupling, while for instance an increase or decrease of the rotational speed of the drive shaft is accompanied by a clearance or closure of the outlet opening by the dosing means.

The coupling can also be a mechanical coupling, while a rotation of the drive shaft via suitable transmission and/or guiding means is converted into a desired displacement of the dosing unit, for instance via a sprocket and gear rack combination or two conical crown wheels. This offers the advantage that no separate drive means are required for operating the dosing unit. Such a mechanical or electric coupling can furthermore lead to greater ease of operation as only the rotation of the drive shaft needs to be set, whereupon a desired displacement of the dosing unit follows "automatically".

In a particularly advantageous embodiment, the mechanical coupling between the drive shaft and the dosing unit utilizes forces of inertia. Such forces of inertia occur when the rotational speed of the drive shaft is abruptly changed. A part, slideably coupled to the drive shaft, will then want to travel in the original direction and at the original speed. This tendency can be converted with the aid of suitable guide means into a desired movement, for instance in axial direction, along the drive shaft. Thus, the dosing unit can be controlled elegantly and rapidly. The inertia effect can be further enhanced through attachment of the paddles to the part slideably coupled to the drive shaft. The fact is that in such a case, the beverage brought to rotation by the blades will continue to propel the blades at the original rotational speed after abrupt change in the rotational speed of the drive shaft.

Naturally, the dosing unit can also be operated via separate drive means. This has as an advantage that the rotational speed and/or direction of the foaming means and the position of the dosing unit and hence, their respective influence on the dispensing flow rate and the quality and/or quantity of the foam formation can be set completely independently of each other.

BRIEF DESCRIPTION OF THE DRAWINGS

In the Figures:

FIG. 8b shows a cross-section of FIG. 8a.

DESCRIPTION OF PREFERRED AND EXEMPLARY EMBODIMENTS

Figure 1:
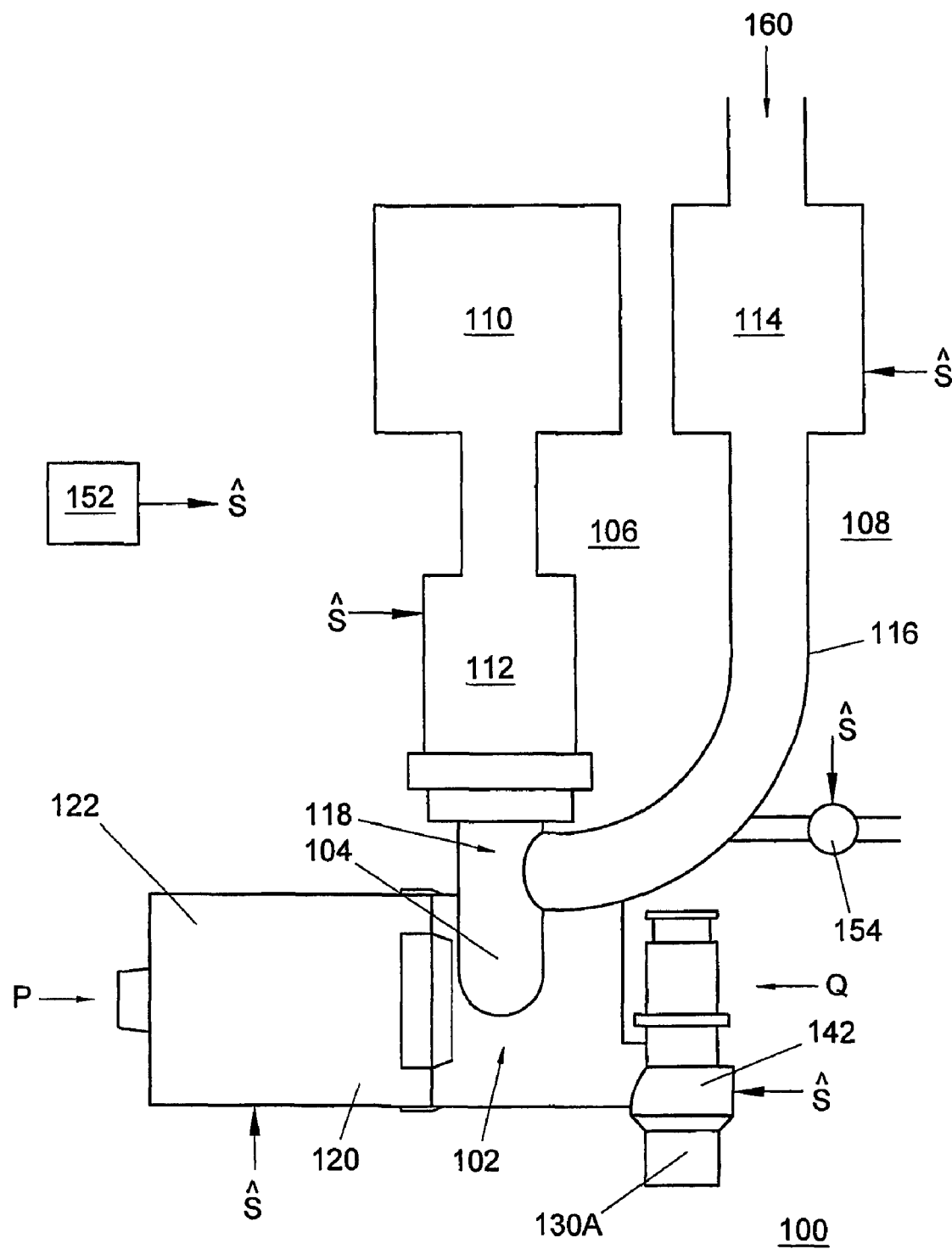
FIG. 1 schematically shows a first embodiment of an apparatus according to the invention for preparing a beverage.

FIG. 1 shows, with reference numeral 100, a first embodiment of an apparatus according to the invention for preparing and dispensing at least one beverage such as coffee, tea, chocolate milk, soup and the like. Here, as desired, the beverage may be foamed. The apparatus is provided with at least one foaming chamber 102 provided with at least one inlet opening 104 for supplying, to the foaming chamber 102, a beverage or ingredients for a beverage which, in mixed condition, form the beverage. In this example, the apparatus is provided with at least one beverage unit 106, 108 for supplying the beverage or ingredients of the beverage to the foaming chamber. In this example, the apparatus is provided with a first beverage unit 106 for supplying a concentrate such as a coffee concentrate to the foaming chamber. To this end, the first beverage unit 106 comprises an exchangeable storage package 110 filled, in this example, with the respective concentrate. Here, only an example is concerned. The first beverage unit 106 may also supply an instant powder for obtaining a ready beverage such as coffee or tea, by means of adding for instance water to the foaming chamber. The beverage unit is further provided with a dosing unit 112 for dispensing the concentrate to the inlet opening 104 in a dosed manner. The apparatus is further provided with a second beverage unit 108, provided, in this example, with a hot water unit 114 for supplying water in a dosed manner via a duct 116 to the inlet opening 104. The concentrate and the water converge upstream of the inlet opening 104 and, in combination, in mixed condition, form the beverage. To this end, for instance if so desired, upstream of the inlet opening, the apparatus can be further provided with a whirl chamber for mixing the concentrate and the water. Such a whirl chamber can for instance be situated at the position 118. It is also possible that the concentrate and the water do not converge until in the foaming chamber to there form the beverage. Also, a ready beverage obtained in a different manner can be supplied to the foaming chamber.

The apparatus is further provided with foaming means 120 (see FIG. 2c) for foaming the beverage flowing through the foaming chamber 102. In this example, the foaming means are provided with a drive 122 and a stirrer 124. here, the stirrer is provided with a drive shaft 126 directed at least virtually horizontally. In this example, the stirrer is provided with paddles 10 extending in radial direction.

The apparatus is further provided with at least one outlet 130a, 130b, in this example a first outlet 130a, 130b which are each in fluid communication with the foaming chamber 102 for dispensing the beverage from the foaming chamber via the respective outlets.

In this example, the apparatus is further provided with at least one dosing unit 132a, 132b for regulating a flow rate of the beverage which, in use, flows from the outlet 130a, 130b. In this example, the apparatus is provided with a first dosing unit 132a for regulating the flow rate of the beverage flowing from the first outlet 130a, and a second dosing unit 132b for regulating the flow rate of the beverage flowing through the outlet 130b. It will be clear that, if desired, the first dosing unit 132a can regulate the flow rate of the beverage which flows from the first outlet 130a, independently of the flow rate of the beverage regulated by the second dosing unit 132b flowing through the outlet 130b. In this example, each dosing unit 132a, 132b is provided with a constriction 134a, 134b in a fluid communication 133 between the foaming chamber and the outlet 130a, 130b, and a plug 136a, 136b which can be moved to and fro in a direction of movement of the plug within at least a part of the fluid communication so that the plug can be moved to a position in which the plug closes off the fluid communication at the constriction 134a, 134b, and the plug can be moved away from the constriction for at least partly releasing the fluid communication. In FIG. 2b it is shown that the plug 136a is moved away from the constriction so that it clears the constriction 134a at least partly. FIG. 2b also shows that the plug 136b closes off the fluid communication in the constriction 134b.

As can be understood from FIG. 2b, a passage 140a will be formed between the plug and the fluid communication, that is, between the plug and the constriction, when the plug releases the fluid communication at the constriction, at least partly.

In this example, the fluid communication 133 comprises a buffer chamber 142 included between the foaming chamber 102 and the outlets 130a, 130b, and a first and second outflow channel 144a, 144b located downstream of the buffer and ending up in the outlets 130a and 130b, respectively.

In this example, the constrictions 130a, 130b respectively, are formed by a transition between the buffer chamber 142 and the outflow channels 144a and 144b, respectively. In this example, the passage has the shape of a closed, loop-forming split.

To this end, the plug 136a, 136b and the constrictions 130a, 130b each have a circular cross-section. Other forms of a closed loop-forming passage such as a passage having the form of a triangle, square, rectangle, pentagon, hexagon et cetera are possible too. It is also possible that a passage is formed forming at least a non-loop-forming split, such as at least a straight split (see for instance FIGS. 8a, 8b). In each of the examples outlined here, the width of the split can be varied as will be further explained.

In this example, it further applies that the constrictions and plugs are each designed to be round. This means that a circular split is formed when a plug partly clears a respective constriction.

As can be clearly seen in FIG. 2b, it applies in this example for each plug 136a, 136b that, at least for a part 146a, 146b, it tapers in the direction of movement of the plug towards the constriction.

It also appears from the drawing that in this example, it applies for each plug 136a, 136b that for closing off the fluid communication 133 to the outlet 130a, 130b, respectively, the respective plug must be moved from a position in which the fluid communication is at least partly released in a downstream direction of the beverage.

It further applies in this example that each plug 136a, 136b is provided with an outer surface that is manufactured, at least for a part 148a, 148b, from a flexible material such as rubber for obtaining a good closure. The apparatus is further provided with a first drive 150a for moving the first plug, and a second drive 150b for moving the second plug.

The apparatus is further provided with a control unit 152 that generates control signals ŝ for controlling the apparatus.

The apparatus described up to this point works as follows. Suppose that it is intended that with the apparatus, a large amount of beverage in the form of coffee is to be prepared, which jug is to be filled from the first outlet 130a. To this end, the control device 152 controls the dosing unit 112 for dispensing an amount of concentrate in a dosed manner. The control device also controls the hot water unit 114 for dispensing, in a dosed manner, an amount of hot water. This hot water and the concentrate converge at the position 118 and form the beverage there. The control device also effects that the drive 150b moves the plug 136b downwards for closing off the constriction 134b. The control unit further controls the drive 150a for moving the plug 136a upwards for completely clearing the constriction 134a. What is achieved in this manner is that the beverage flows at a relatively great flow rate through the foaming chamber 102, the buffer chamber 142, the outflow channel 144a, respectively, to then flow from the outlet 130a into the jug. If it is desired to whip some air into the beverage, the control unit 152 can start the drive 122 so that the stirrer starts revolving whereby air is whipped into the beverage that flows through the foaming chamber 102. As the flow rate is relatively large, a relatively small amount of air will be whipped into the beverage. Thus, in the jug, coffee is formed with a fine-bubble foam layer. If it is desired that virtually no air be whipped in, the control unit 152 can bring the stirrer 124 to a halt.

When the total amount of beverage is prepared, the control unit 152 will stop the dosing device 112 and stop the hot water unit 114. Preferably, the dosing device 112 will then be stopped sooner than the hot water unit 114 so that, with the aid of the hot water, a remainder of the beverage and the concentrate can be rinsed from the apparatus.

Presently, it will be described in what manner, with the aid of the apparatus, a small amount of coffee with, in this example, a fine-bubble foam layer can be prepared. In this example, this small amount of beverage will be dispensed via the outlet 130a. It is, however, also possible to dispense the beverage via the outlet 130b. This also applies when, as discussed hereinabove, a large amount of coffee is to be prepared.

The control unit 152 will control the drive 150a in such a manner that the plug 136a is moved upwards in upstream direction, so that between, on the one side, the plug and, on the other side, the constriction, an annular split (which, in this example, is in fact conical) is formed as can be seen in FIG. 2b. The effective width of this split (that is to say the size of a fluid passage surface between the constrictions and the plug) can still be regulated through the extent to which the plug 136a is moved upwards relative to the constriction 134a. The result is that the constriction is at least partly closed off and, with the aid of the plug, an uphold is formed. The control unit 152 also starts the stirrer 124. The control unit also starts the dosing device 112 for dispensing a predetermined amount of concentrate. Furthermore, the control unit 152 starts the hot water unit 114 for dispensing a predetermined amount of hot water. Concentrate and water flow in the form of a beverage to the foaming chamber 102. As a result of the rotation of the stirrer, air is whipped into this beverage. The beverage then flows further to the constriction 134a and 134b. As the constriction 134b is closed off, the beverage can leave the buffer chamber only via the constriction 134a. As the plug 136a closes off the constriction at least partly, the beverage can flow from the buffer chamber only at a relatively small flow rate, to then leave the apparatus via the outlet 130a. As this flow rate is relatively small, the residence time of the beverage and, hence, the magnitude of the flow rate at which the beverage flows through the foaming chamber 102, can be limited. The result is that relatively much air is whipped into the beverage. Thus, a small amount of beverage with relatively much foam is dispensed. The annular split 140a furthermore results in that air bubbles that are larger than the split cannot pass the split and will break. Thus, an attractive, homogenous fine-bubble foam layer is obtained. When sufficient concentrate and water is dispensed, the control unit 152 stops the dosing device 112 again and, if desired, a short while later, the hot water unit 114. The remaining beverage and concentrate then flows from the foaming chamber, buffer chamber and is collected in a cup.

In particular, when the preparation of the beverage is started, the control unit 152 can control the dosing unit 112 in a manner such that this closes off the outlet 130a, at least temporarily. The result is that, after the buffer chamber is filled with beverage, the foaming chamber will be rapidly filled with the beverage. The residence time of the beverage then present in the foaming chamber is relatively long. When the foaming chamber is at least virtually full, which will happen relatively rapidly as the rotating stirrer causes a large portion of the volume of the foaming chamber to not be filled with the beverage, the control unit 152 can move the plug 136a upwards so that the constriction is at least partly cleared, as a result of which the foaming chamber 102 begins to empty via the buffer chamber and the outlet 130a. Simultaneously, concentrate and water can still be supplied to the foaming chamber. The amount of beverage present in the foaming chamber remains virtually constant during this period. Then, if sufficient beverage is prepared, the control unit 152 can deactivate the dosing device 112 and the hot water unit 14 as described hereinabove.

In this example, the apparatus is further provided with a controllable aeration valve 154. To fine-tune the amount of air that is whipped in, the control unit 152 can further open, partly close or completely close the aeration valve 154. Such variants are all understood to fall within the framework of the invention.

Figure 3:
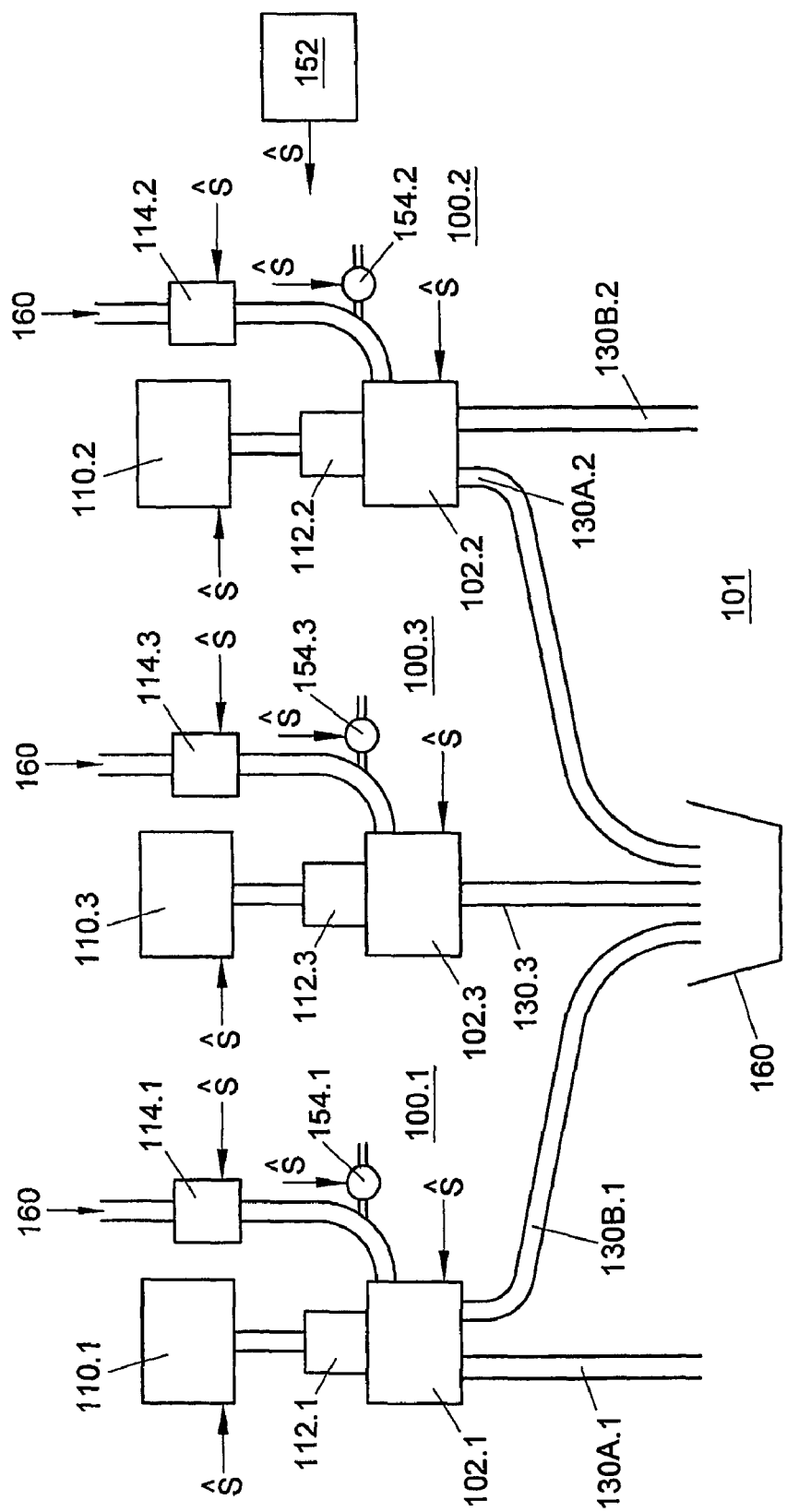
FIG. 3 shows a second embodiment of an apparatus according to the invention.

Presently, with reference to FIG. 3, a second embodiment of an apparatus 101 according to the invention is described. The apparatus 101 is provided with a first apparatus part 100.1 that corresponds to the apparatus according to FIG. 1. The apparatus 101 is further provided with a second apparatus part 100.2 that also corresponds to the apparatus according to FIG. 1. Finally, the apparatus 101 is provided with a third apparatus part 100.3 that corresponds, at least virtually, to the apparatus 100 according to FIG. 1. The apparatus 101 further comprises a joint control unit 152 for controlling the apparatus parts 100.1, 100.2 and 100.3. As can be seen, the apparatus part 100.3 is provided with only one outlet 130.3 and, hence, also with one dosing unit 132.3.

It further appears that the outlet 130b.1 of the first apparatus part 100.1, the outlet 130a.2 of the second apparatus part 100.2 and the outlet 130.3 of the third apparatus part 100.3 converge so that from these outlets one mug or jug 160 can be filled. In this example, the storage package 110.1 of the first apparatus part 100.1 is filled with coffee concentrate. The storage package 110.2 of the second apparatus part 100.2 is filled with concentrate for chocolate milk. Finally, the storage package 110.3 of the third apparatus part 100.3 is filled with milk concentrate. The operation of each of the apparatus parts 100.1-100.3 is completely analogous to what is described hereinabove. If, for instance, coffee is to be prepared, coffee can be dispensed in a jug or a mug with the aid of the first apparatus part 100.1, via the outlet 130a.1. As described hereinabove, if desired, a large amount of coffee or a small amount of coffee can be dispensed, provided or not provided with a fine bubble foam layer. Also, under the control of the control unit 152, in a completely analogous manner, coffee can be dispensed via the second outlet 130b.1. Here, simultaneously, by means of the third apparatus part 100.3, milk can be dispensed via the outlet 130.3. Thus, coffee and milk can be dispensed to the holder 160 for preparing coffee with milk. Here, first of all, the coffee may be dispensed and then the milk. The milk may be provided with foam so that a cappuccino is formed. The foam is then prepared by the third apparatus 100.3, with the aid of the foaming chamber 102.3 and the foaming means 120, completely analogously to what is discussed with reference to FIGS. 1 and 2.

Completely analogously to what is discussed with reference to FIGS. 1 and 2, with the aid of the second apparatus part 100.2, for instance, chocolate milk can be dispensed via the outlet 130b.2. Chocolate milk can also be dispensed via the outlet 130a.2. Optionally, the chocolate milk ending up in the holder 160 can further be provided with coffee, provided or not provided with foam dispensed by means of the first apparatus part 100.1, and milk provided or not provided with foam dispensed by means of the third apparatus part 100.3. Here, too, as described hereinabove, a change can be made between small and large amounts of coffee or milk or chocolate milk. Such variants are all understood to fall within the framework of the invention. The invention is not limited in any manner to the embodiments outlined hereinabove. For instance, the hot water unit 114 can also dispense cold water, or the temperature of the water can be adjusted under the control of the control unit 152. This applies to each of the embodiments outlined hereinabove. The hot water devices can each be connected to, for instance, a water duct 160 or a storage vessel with water.

For each of the embodiments outlined hereinabove it applies that a flow path from the beverage unit 106 to the at least one outlet 130a, 130b is designed to be closed off from the environment. This has special advantages with respect to hygiene. In the given examples, each plug closes off the fluid communication in the constriction. However, at its underside, the plug can also be wider than the constriction. As a result, the plug will lie over the constriction for closing off the constriction.

Figure 5:
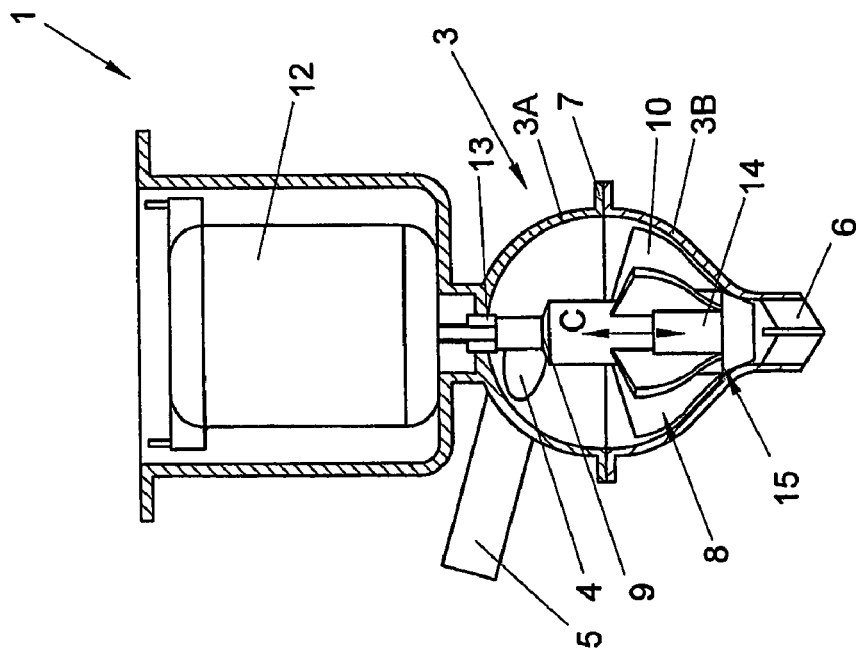
FIG. 5 shows a foaming chamber according to FIG. 4, with the foaming and dosing means in a second position, wherein the outlet opening is substantially closed off.
Figure 4:
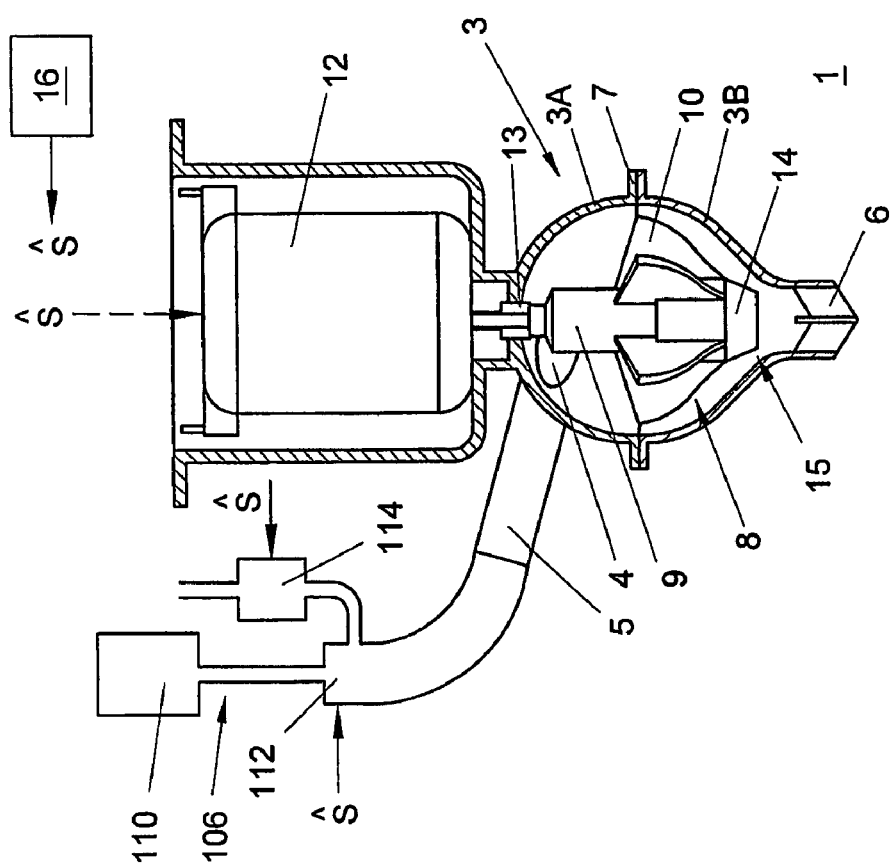
FIG. 4 shows a third embodiment of an apparatus according to the invention provided with combined foaming and dosing means, in a first position wherein an outlet opening of the foaming chamber is cleared for the greater part.

FIGS. 4 and 5 show an alternative embodiment of an apparatus 1 according to the invention, comprising a substantially spherical foaming chamber 3 which is provided adjacent an upper side with an inlet opening 4 and supply means 5 connected thereto, for the supply of beverage prepared upstream, and which is provided adjacent a lowermost point with a central outlet opening 6 for discharging beverage, optionally via a dispensing tube (not shown) connected to the outlet opening 6. The foaming chamber 3 further comprises foaming means 8, which, in the exemplary embodiment shown, comprise a shaft 9 arranged centrally in the chamber 3 above the outlet opening 6, which shaft extends substantially vertically and is provided all around with a number of paddles 10, in the example shown six, reaching radially to just before the inside wall of the foaming chamber 3. The central shaft 9 is driven by drive means 12, for instance an electric motor, disposed above the foaming chamber 3, optionally via reduction means 13 suitable thereto and known per se. The drive means and reduction means 12, 13, are preferably dimensioned such that the central shaft 9 can be propelled herewith at a speed of approximately 6000 to 10,000 revolutions per minute.

The apparatus 1 further comprises a dosing unit for regulating a flow rate through the outlet opening 6. In the following, this dosing unit will also be indicated as dosing means 15. In the exemplary embodiment shown, these dosing means 15 are formed by a somewhat tapering extremity 14 of the central drive shaft 9, which is fittingly receivable in the outlet opening 6 and, in a manner to be further described, is displaceable to that end in the direction of arrow C (FIG. 5) between a first position as shown in FIG. 4, wherein the outlet opening 6 is largely cleared, and a second position as shown in FIG. 5, wherein said opening 6 is largely blocked. It therefore applies that the foaming chamber tapers in the flow direction towards the outlet while the stirrer is positioned in the foaming chamber such that, in use, when the stirrer rotates sufficiently rapidly, as a result of centrifugal forces, the beverage flows in the direction of the tapering wall.

Figure 6:
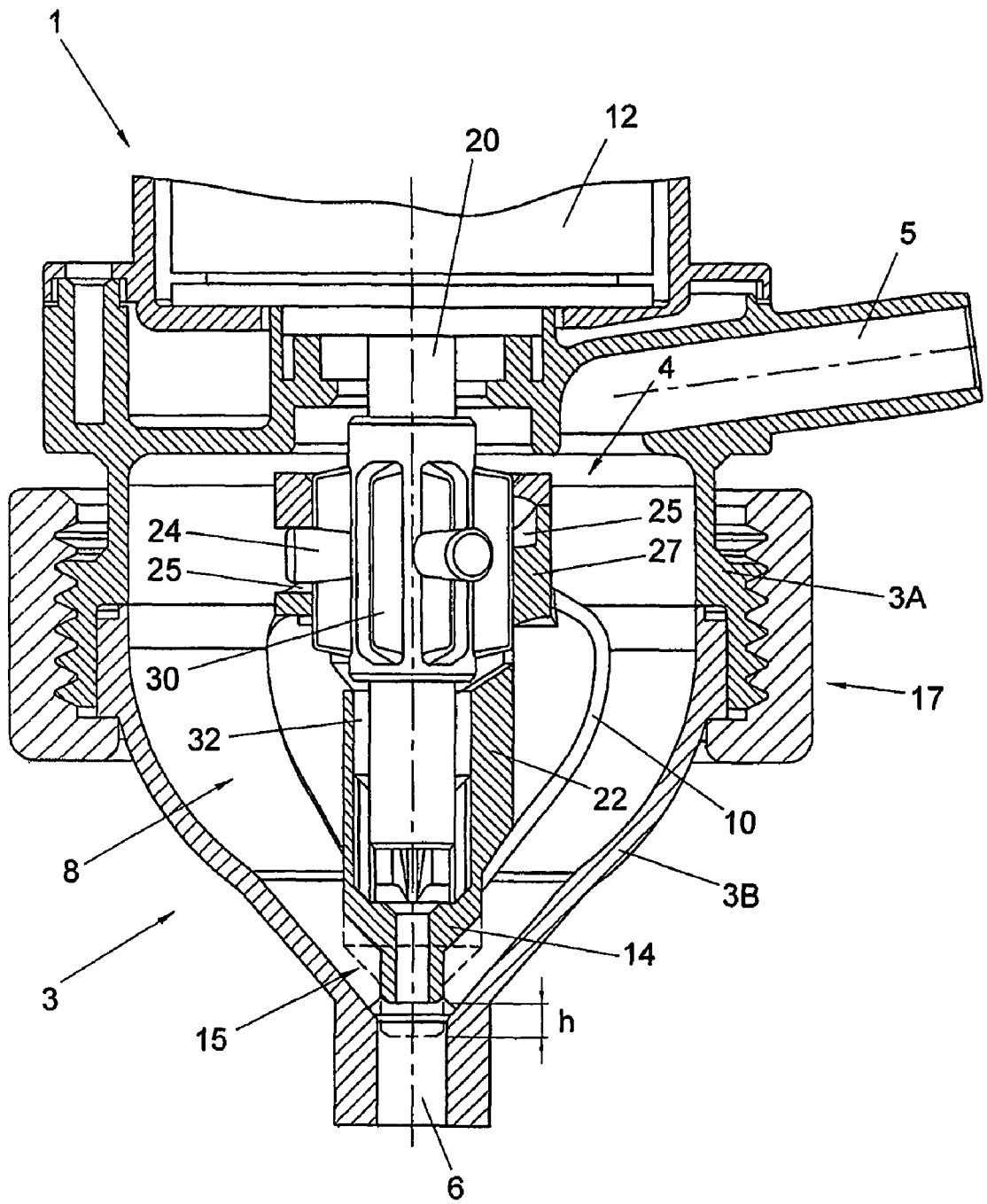
FIG. 6 shows, in further detail, a possible embodiment of foaming and dosing means according to the invention, wherein the operation of the dosing means is coupled to a rotating movement of the foaming means.

It is preferred that the foaming chamber 3 is built up from two or more parts, for instance to half spheres 3A,B, which are mutually detachably coupled by means of, for instance, flanges 7 screwed against each other (see FIGS. 4 and 5) or a screw thread connection 17 (see FIG. 6). Owing to such a design, the foaming chamber 3 and foaming means and dosing means 8, 15 disposed therein can be cleaned in a simple manner.

The apparatus 1 further comprises a central control unit 16 (only schematically represented in FIG. 4) which is designed for controlling the beverage preparation process on the basis of an order given by a consumer and which, to that end, can control, inter alia, the foaming means 8 and the dosing means 15.

The apparatus 1 works as follows. After a user has passed on his choice for a particular amount and type of beverage via an input panel (not further shown), this beverage is prepared upstream of the foaming chamber 3, for instance by mixing a liquid or powder-shaped concentrate with a liquid, usually water, by means of a beverage unit 106 as described with reference to FIG. 1. Thereupon, this beverage is passed via the supply means 5 and the inlet opening 4 into the foaming chamber 3. It is also possible that the ingredients for the beverage converge only in the foaming chamber 3 so that the beverage is formed in the foaming chamber. If the consumer has selected an unfoamed beverage, the control unit 16 will switch the foaming means 8 off and steer the dosing means 15 to the highest position (as shown in FIG. 4), wherein the outlet opening 6 is maximally cleared. In his position, the apparatus 1 is suitable for dispensing large as well as small amounts of beverage, at maximum dispensing flow rate.

When the consumer has selected a foamed beverage, the control unit 16 will activate the foaming means 8 so that air is whipped into the beverage by means of the rotating paddles 10. Depending on the amount of beverage desired by the consumer, the dosing means 15 can, in that case, be guided downwards or upwards. In the low position, they will largely close off the outlet opening 6 and the dispensing flow rate will consequently be small. Therefore, this position is suitable for the preparation of relatively small amounts of beverage with qualitatively good foam. After the beverage has been sufficiently foamed, the outlet opening can, for that matter, still be cleared in order to accelerate the outflow of foamed beverage. In the high position, the dispensing flow rate will be large. Therefore, this position is suitable for dispensing relatively large amounts of beverage, with less foam and/or foam of poorer quality. In order to, in this case, improve the foam quality and/or quantity, optionally, the residence time in the foaming chamber can be lengthened, by driving the foaming means at a speed of revolution such that under the influence of centrifugal forces, the beverage is retained in the chamber 3.

The dosing means and foaming means 15, 8 can be designed as separate parts, independently operable of each other, but are preferably at least partly coupled, as indicated in FIGS. 4 and 5. The dosing means 15 will then rotate along with the foaming means 8 and the foaming means 8 will move along upwards and downwards with the dosing means 15. An advantage of such an embodiment is that the rotation of the foaming means 8 can be advantageously utilized for moving the dosing means 15 so that singular drive means 12 can suffice. This will be further elucidated by way of example with reference to FIG. 6.

In this embodiment, the central drive shaft 9 is built up from an inner axle 20 driven by the drive means 12 and an outer axle 22 surrounding this inner axle, which outer axle is coupled for rotation by means of an annular coupling part 27 to the inner axle 20 in a manner to be further described. The outer axle 22 is provided around its circumference with a number of radial paddles 10 which, in use, function as the earlier described foaming means 8, and further comprises a somewhat tapering end 14 which is fittingly receivable in the outlet opening 6 and functions, in use, as dosing means 15.

Figure 7:
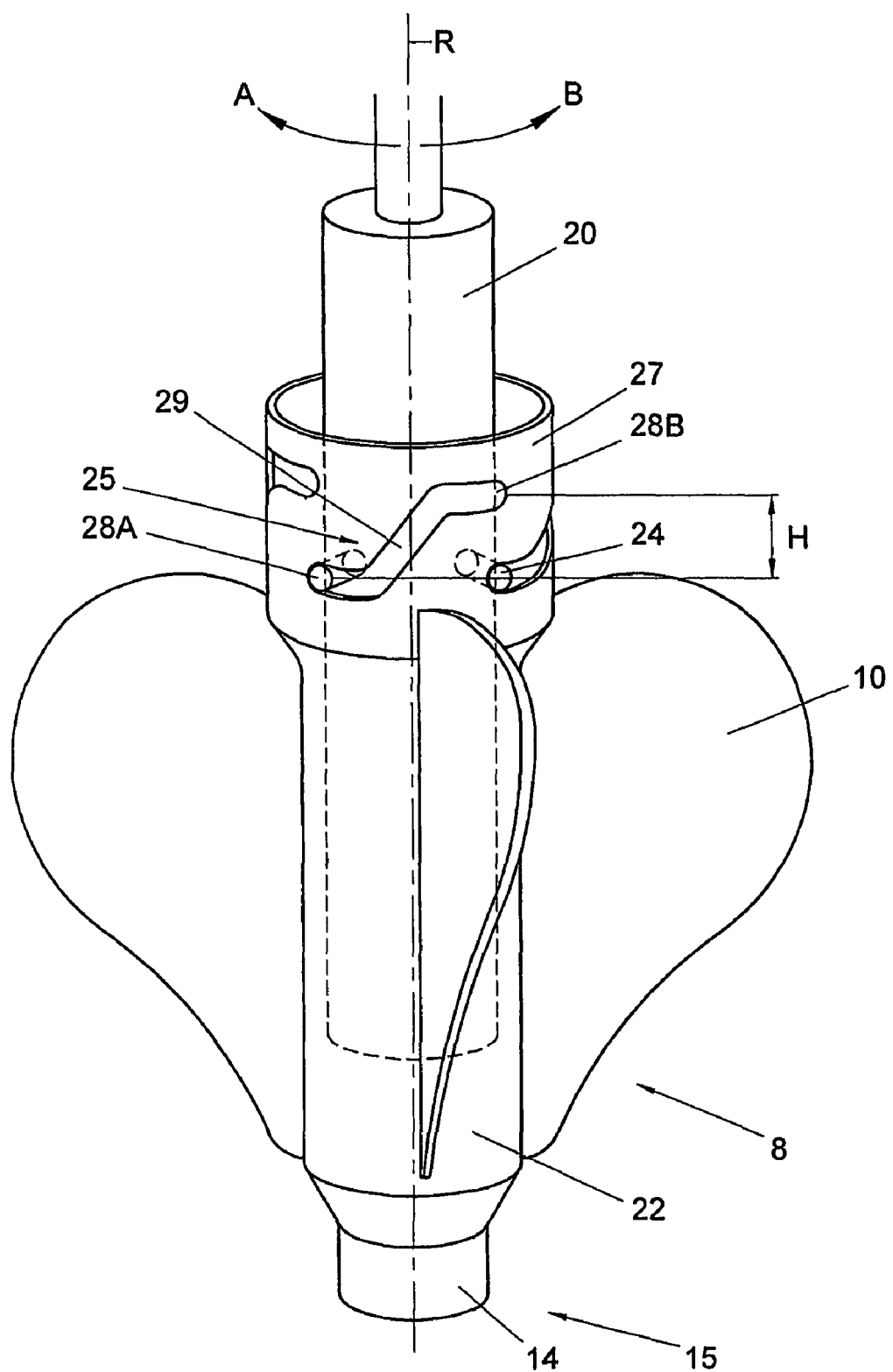
FIG. 7 shows, in further detail, the coupling according to FIG. 6, which converts the rotating movement of the foaming means into a translating movement of the dosing means.

For the purpose of the rotatable coupling, the inner axle 20 comprises four radial guiding cams 24 which reach into guiding grooves 25 provided thereto in the annular coupling part 27. These guiding grooves 25 each have a substantially Z-shaped configuration (see FIG. 7), with two legs 28A,B extending tangentially, and a center part 29 obliquely ascending therebetween. The distance H between the legs 28A,B (measured between both central axes) defines the maximum axial displacement of the outer axle 22 relative to the inner axle 20 and therefore the maximum adjusting height h of the dosing means 15 (see FIG. 6).

The inner axle 20 further comprises a number of spacing means in the form of ribs 30 reaching between the guiding cams 24 as far as an inner wall of the annular coupling part 27, and one or more bearings 32, for supporting and centring the outer axle 22, preferably at least adjacent the extremity 14 thereof. It is preferred that the inner axle 20 is light-weight, for instance through a partly hollow construction and/or use of light-weight material. By contrast, the outer axle 22 with the paddles 10 can be of more heavy construction.

The above-described embodiment works as follows. In the position represented in FIG. 6 in full lines, the outlet opening 6 is substantially cleared and the guiding cams 24 of the inner axle 20 reach into the lower legs 28A of the guiding grooves 25. As a result, the outer axle 22 is carried along when the inner axle 20 is driven in the direction of arrow A (see FIG. 7). When this drive is abruptly stopped or reversed in direction, as a result of its inertia, the outer axle 22 will continue to move in the direction of arrow A. As a result, the guiding cam 24 leaves the leg 28A and the outer axle 22 is moved downward, through the cooperation between the guiding cam 24 and the inclining center part 29 of the guiding cam 24, until the guiding groove 25 enters the other groove end 28B and thus prevents further rotation of the outer axle 22 relative to the inner axle 20. In this position (represented in FIG. 6 in broken lines), the outer axle 22 will be carried along by the cam 24 in opposite direction, therefore in the direction of arrow B, when the inner axles 20 is driven in that direction. When, thereupon, the drive is again abruptly stopped or reversed in direction, the outer axle 22 will travel the aforementioned path in opposite direction and therefore move upwards owing to the cooperation between the guiding cam 24 and guiding groove 25. The inertia effects mentioned will be stronger when the foaming chamber 3 is filled with beverage as, in that case, the beverage brought to rotation by the paddles 10 will continue to propel these paddles 10 for some time in the original direction of rotation after abrupt change of this direction of rotation or speed.

In summary, in the high position shown in FIG. 6, the foaming means 8, formed by the outer axle 22 and the paddles 10, can stand still or rotate to the right (in the direction of arrow A) and, in the low position, stand still or rotate to the left (in the direction of arrow B). The dosing means 15 can be brought in the high position or low position, respectively, through an abrupt change of the drive direction to the right (arrow A), or to the left (arrow B), respectively. It will be clear that in this manner it is possible that, if the dosing means are brought to the high position, wherein the outlet opening is cleared, the foaming means can be activated or deactivated and that if the dosing means are brought in the low position, wherein the outlet opening is largely closed off, the foaming means can be activated or deactivated. Thus, in this example, if the dosing means and foaming means are at least partly coupled, the foaming means can be operated independently of the fact whether the dosing means are cleared or, at least largely, closed off. Generally, it therefore applies according to the invention that the foaming means can be operated independently of the dosing means. The above-mentioned principle can be utilized as follows in an apparatus 1 according to the invention for regulating the foam formation and/or a beverage dispensing flow rate. When a large amount of unfoamed beverage is desired, the inner axle 20 is abruptly stopped when this was driven to the left, or abruptly driven to the right when it was at a standstill. As a result, the outer axle 22 is brought to its high position, wherein the extremity 14, alias the dosing means 15, clear the outlet opening 6 virtually completely. Then, beverage can be guided via the inlet opening 4 through the foaming chamber 3 and flow therefrom virtually undisturbedly so that relatively large amounts of beverage can be dispensed relatively rapidly.

If a small amount of foamed beverage is desired, the inner axle 20 is abruptly stopped if this was driven to the right, or abruptly driven to the left if this was at a standstill. As a result, the outer axle 22 will move downwards in the manner described hereinabove, whereby the extremity 14 will largely block the outlet opening 6. Beverage can then be fed via the inlet opening 4 into the foaming chamber 3 while driving of the inner axle 20 to the left is continued. The outer axle 20 and the paddles 10 will then be carried along, so that air is whipped into the beverage. When the beverage has thus been sufficiently foamed, the inner axle 20 still rotating to the left can be stopped whereby the outer axle 22 moves upwards and the outlet opening 6 is cleared, so that the foamed content can flow from the chamber 3.

Alternatively, when a relatively small amount of foamed beverage is desired, the outer axle 22 with the stirring means 8 can be brought to a high position, by driving the inner axle 20 abruptly to the right. The beverage can then be fed into the chamber 3 while the foaming means 8 are still driven to the right. Although, in this position, the outlet opening 6 will be virtually completely cleared, outflow of the beverage can be prevented by the centrifugal forces applied by the foaming means 8 to the beverage. When the beverage has been sufficiently foamed, the drive is stopped whereby the outer axle 22 with the paddles 10 moves downwards and will largely block the outlet opening 6. As a result, the foamed beverage can flow away only slowly. Surprisingly it has appeared that this is advantageous to the quality of the foam. As a result, this retains a firm, fine structure.

Thus, through a suitable drive of the inner axle 20, both the beverage flow rate and the formation of foam can be influenced, so that only one set of drive means 12 can suffice.

The invention is not limited in any manner to the exemplary embodiments represented in the description and the drawing. All combinations of (parts of) embodiments described and/or shown are understood to fall within the inventive concept. Moreover, many variations thereon are possible within the framework of the invention as outlined by the claims.

For instance, the geometry of the paddles can be used for generating upward or downwards forces, depending on the direction of rotation, for displacing the dosing means. The drive shaft with the paddles can also extend substantially horizontally. The rotating movement of the drive shaft can be converted with other transmission means known per se into a translating movement of the dosing means, with the aid of, for instance, a sprocket, reverse gear and/or gear rack. Adjacent the extremities of the gear rack, clearance provisions can be provided for limiting the maximum stroke of the dosing means and allowing unhindered rotation of the stirring means in the farthest positions. It is also possible to move the foaming chamber, instead of the dosing means at least a part thereof in which the outlet opening is located. In addition to or instead of paddles, other types of foaming means can be provided, for instance spiral-shaped or sieve-shaped whisking means, which, if desired, can make a different movement, for instance oscillating instead of rotating.

Figure 2A:
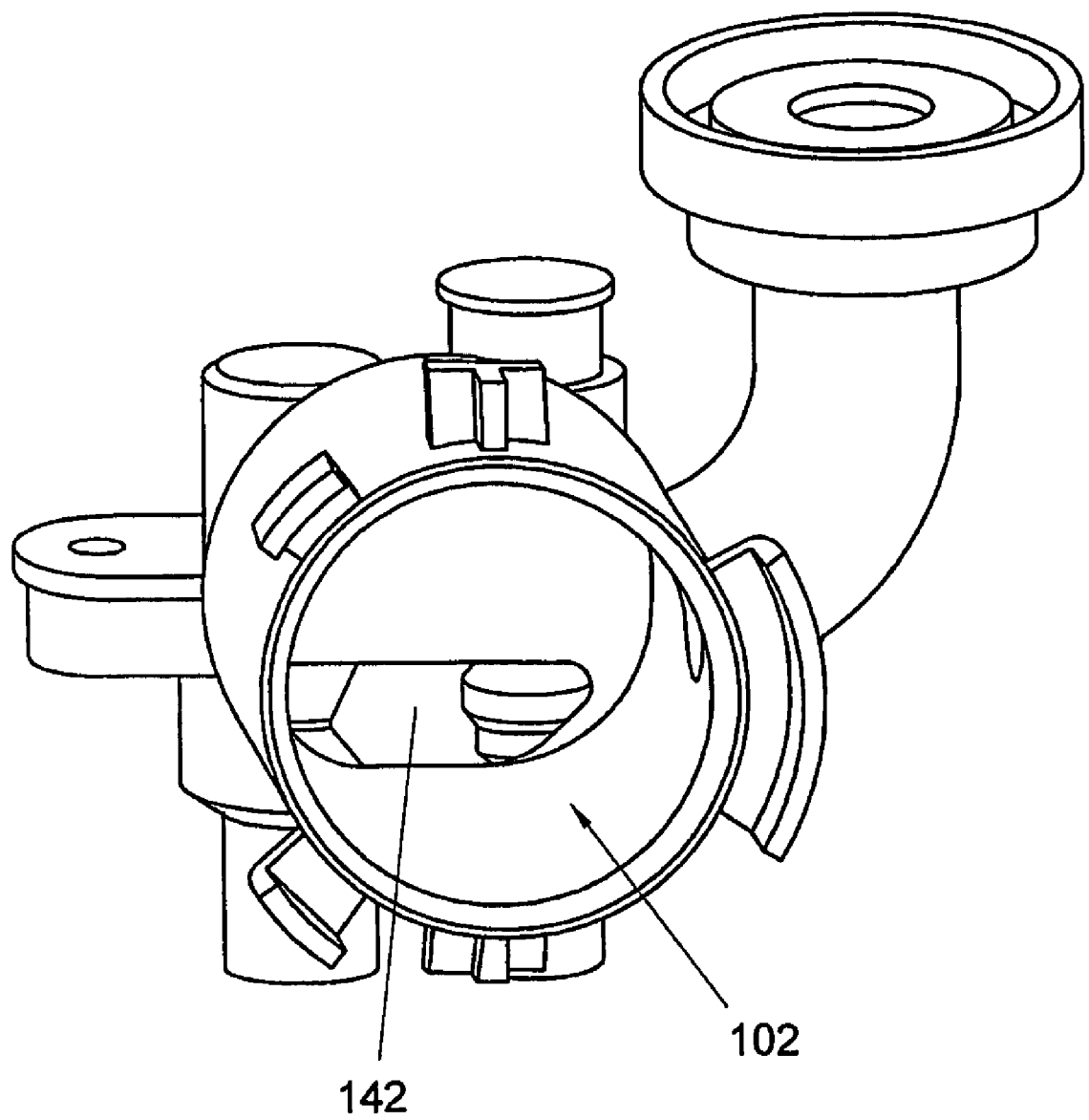
FIG. 2a shows an elevational view in the direction of the arrow P according to FIG. 1 of a part of the apparatus according to FIG. 1.
Figure 2B:
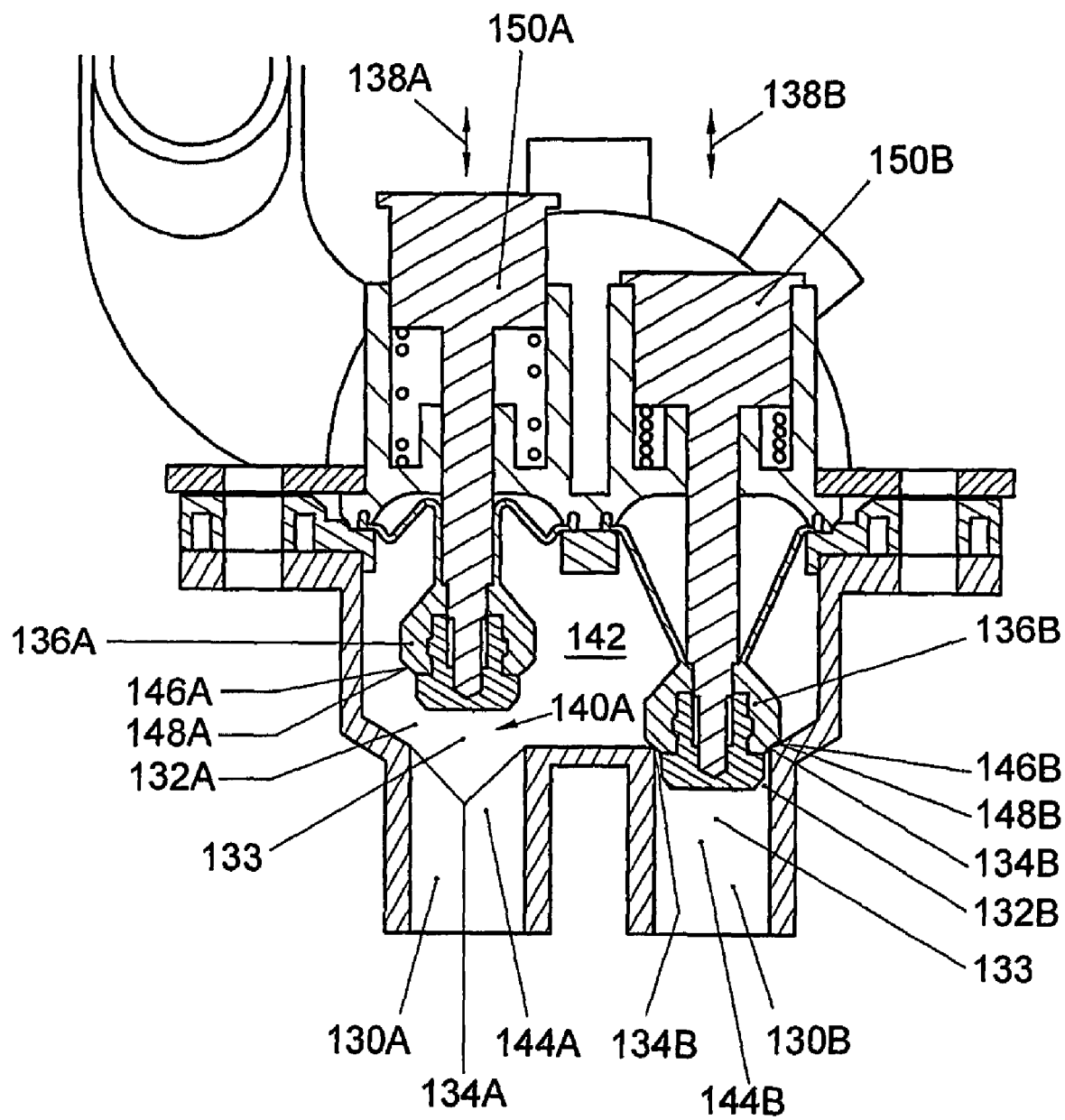
FIG. 2b shows a transparent view in the direction of the arrow Q of FIG. 1 of a part of the apparatus according to FIG. 1.
Figure 2C:
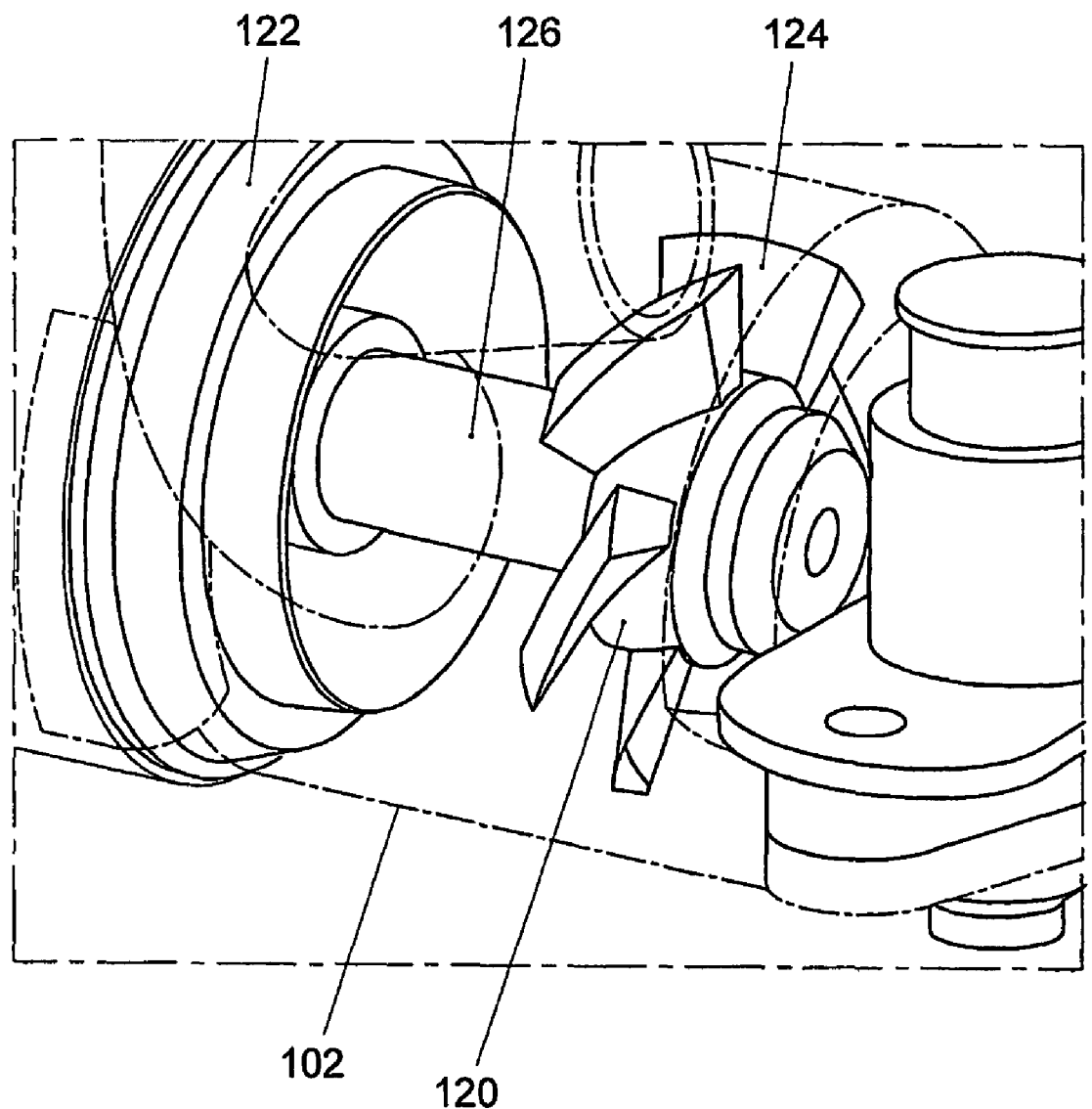
FIG. 2c shows a transparent view of a part of the apparatus according to FIG. 1.
Figure 8A:
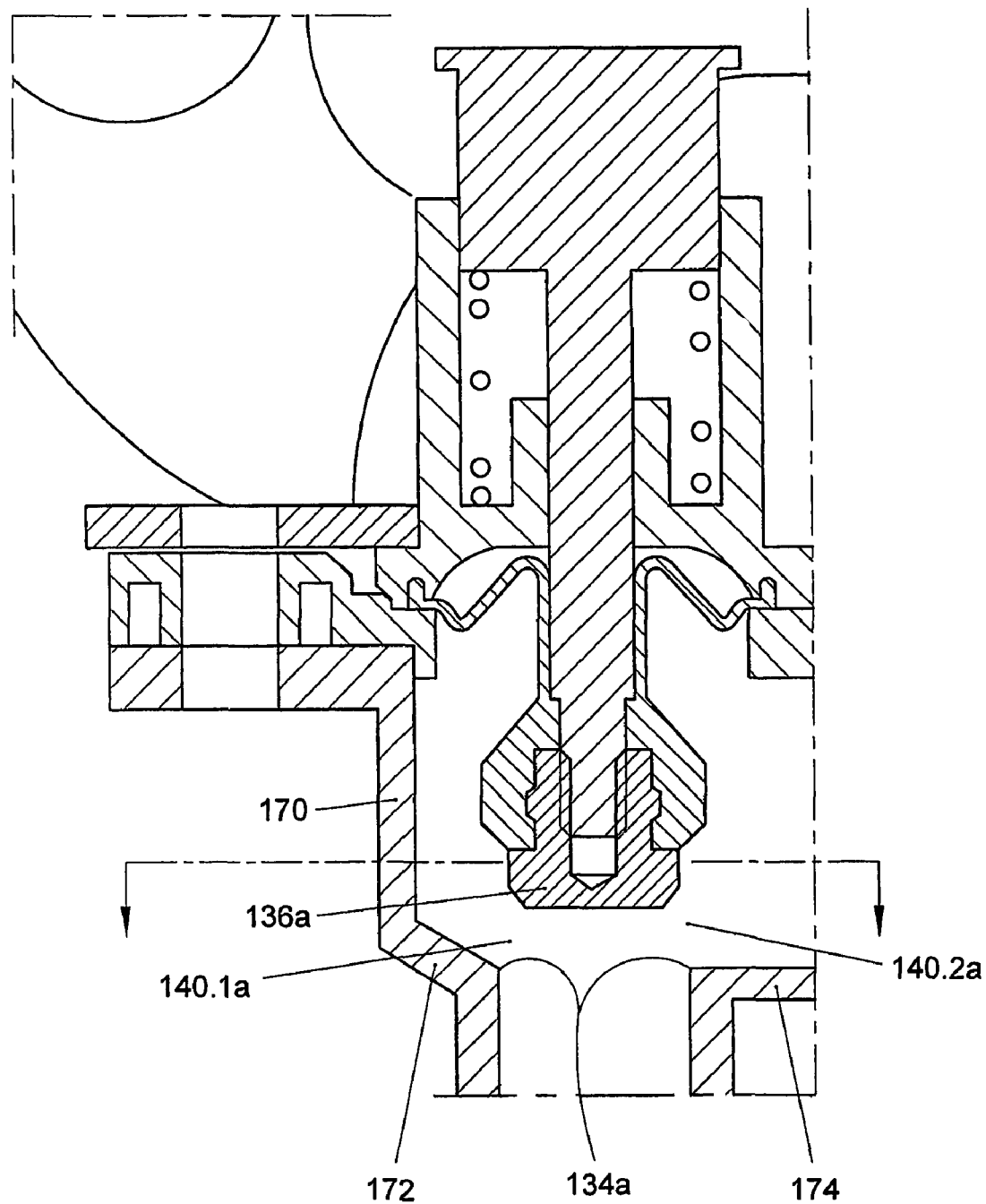
FIG. 8a shows an alternative embodiment of a part of the apparatus according to FIG. 1.
Figure 8B:
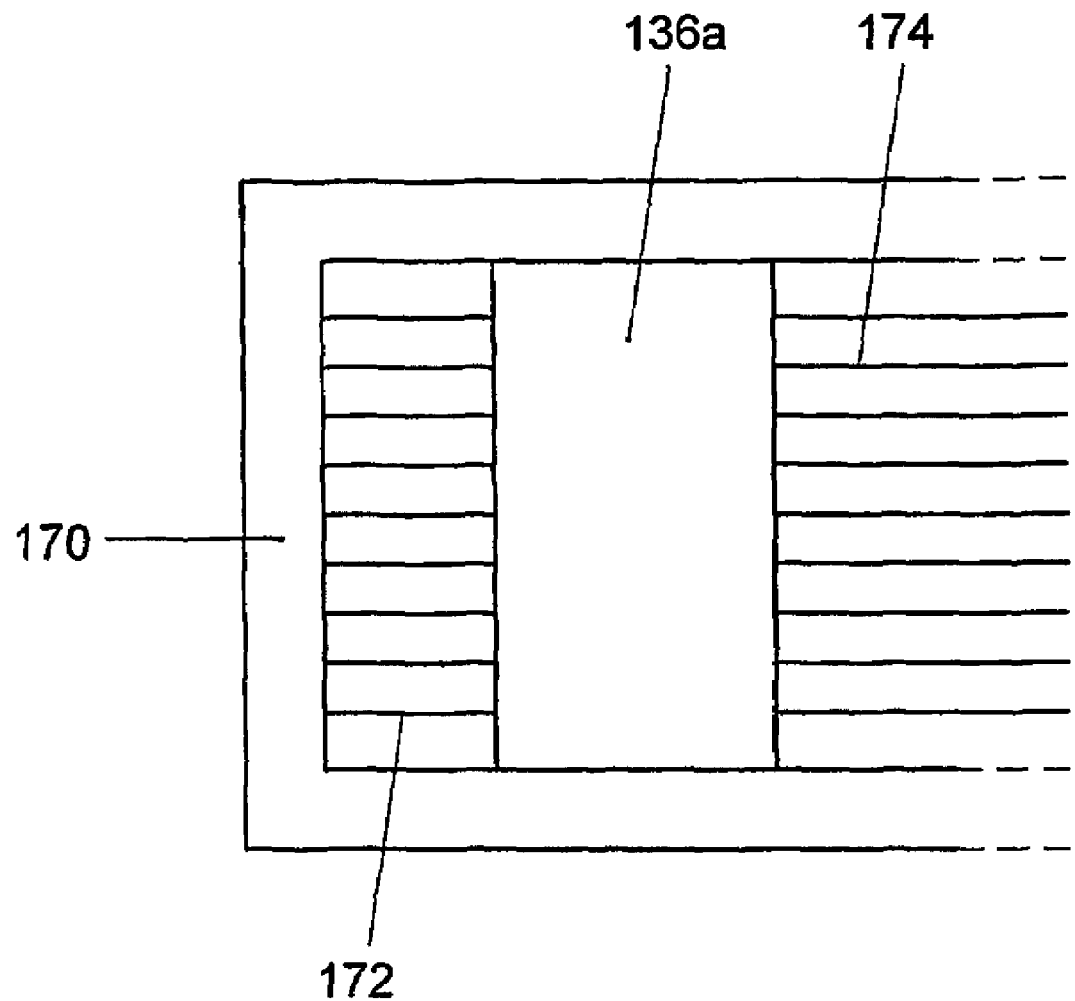

The apparatus 100, 101 according to FIGS. 1-3 can also, instead of a passage forming a closed loop, be provided with a passage not forming a closed loop. FIGS. 8a, 8b for instance show that instead of a circular cross-section, the constriction 134a has a rectangular cross-section. A foaming chamber or buffer chamber 170 can then have a rectangular cross-section. In FIGS. 8a, 8b, the chamber 170 comprises a part 172 tapering in the flow direction towards the outlet. In FIGS. 8a, 8b, the chamber 170 further comprises a flat part 174. The flat part 174 extends between, for instance, two outlets. The plug 136a also has a rectangular cross-section so that the passage formed between the constriction 134a and the plug 136a is provided in this example with two straight splits 140.1a and 140.2a. Other variations such as one straight split, at least one not-straight split such as a curved split and the like also belong to the possibilities when the stop does not close off the constriction.

These and many variations are understood to fall within the framework of the invention as set forth in the following claims.

The invention claimed is:

1. An apparatus for preparing and dispensing at least one beverage such as coffee, tea, milk, chocolate milk, or soup, which beverage can, if desired, be at least partly foamed, the apparatus comprising:
   at least one foaming chamber having at least one inlet opening for supplying to the foaming chamber a beverage or ingredients for a beverage, and a foaming device for foaming the beverage which flows through the foaming chamber;
   at least one outlet which is in fluid communication with the foaming chamber for dispensing the beverage from the foaming chamber;
   at least one dosing unit for regulating a flow rate of the beverage which flows from the outlet;
   wherein the at least one outlet and at least a portion of the at least one dosing unit are movable relative to one another such that the outlet can be closed off to a greater or lesser extent, and wherein the foaming device is provided with at least one stirrer included in the at least one foaming chamber.

2. The apparatus of claim 1, wherein the dosing unit is provided with a constriction in a fluid communication between the foaming chamber and the outlet, and a plug which can be moved to and fro in a direction of movement of the plug within at least a part of the fluid communication so that the plug can be moved in a position wherein the plug closes off the fluid communication at the constriction, and the plug can be moved away from the constriction for releasing the fluid communication at least partly.

3. The apparatus of claim 2, wherein a passage is formed between the plug and the fluid communication when the plug partly releases the fluid communication at the constriction.

4. The apparatus of claim 2, wherein the fluid communication is closed off from an environment of the apparatus.

5. The apparatus of claim 2, wherein the constriction and the plug are designed to be round.

6. The apparatus of claim 5, wherein at least one closed loop-forming split is formed when the plug partly releases the fluid communication at the constriction.

7. The apparatus of claim 2, wherein an outer surface of the plug tapers at least partly in the direction of movement from the plug to the constriction.

8. The apparatus of claim 2, wherein the plug for closing off the fluid communication is to be moved from a position wherein the fluid communication is at least partly released in downstream direction of the beverage.

9. The apparatus of claim 2, wherein the plug is provided with outside surface which is at least partly manufactured from a flexible material such as rubber.

10. The apparatus of claim 1, wherein the stirrer is provided with a drive shaft directed at least virtually horizontally.

11. The apparatus of claim 2, wherein the apparatus is further provided with a drive for moving the plug.

12. The apparatus of claim 1, wherein the at least one dosing unit is located downstream of the foaming device.

13. The apparatus of claim 1, wherein the foaming device can be operated independently of the at least one dosing unit.

14. The apparatus of claim 1, wherein the foaming device also function as the dosing unit.

15. An apparatus for preparing and dispensing at least one beverage such as coffee, tea, milk, chocolate milk, or soup, which beverage can, if desired, be at least partly foamed, the apparatus comprising:
- at least one foaming chamber having at least one inlet opening for supplying to the foaming chamber a beverage or ingredients for a beverage, and a foaming device for foaming the beverage which flows through the foaming chamber;
- at least one outlet which is in fluid communication with the foaming chamber for dispensing the beverage from the foaming chamber;
- at least one dosing unit for regulating a flow rate of the beverage which flows from the outlet;
- wherein the dosing unit is provided with a constriction in a fluid communication between the foaming chamber and the outlet, and
- wherein the fluid communication is provided with a buffer chamber and an outflow channel located downstream of the buffer chamber and ending up in the outlet.

16. The apparatus of claim 15, wherein the constriction is formed by the transition between the buffer chamber and the outflow channel.

17. An apparatus for preparing and dispensing at least one beverage such as coffee, tea, milk, chocolate milk, or soup, which beverage can, if desired, be at least partly foamed, the apparatus comprising:
- at least one foaming chamber having at least one inlet opening for supplying to the foaming chamber a beverage or ingredients for a beverage, and a foaming device for foaming the beverage which flows through the foaming chamber;
- at least one outlet which is in fluid communication with the foaming chamber for dispensing the beverage from the foaming chamber;
- at least one dosing unit for regulating a flow rate of the beverage which flows from the outlet;
- wherein the foaming device comprises a drive shaft arranged for rotation, provided with a stirrer provided with, for instance, paddles extending in radial direction.

18. The apparatus of claim 17, wherein operation of the dosing unit is coupled to rotation of the drive shaft.

19. The apparatus of claim 17, wherein the dosing unit comprises a part slideable along the drive shaft for closing off or clearing, respectively, the outlet.

20. The apparatus of claim 19, wherein the slideable part is coupled to the drive shaft such that sliding therealong can take place under the influence of forces of inertia upon an abrupt change in the speed of rotation of the drive shaft.

21. The apparatus of claim 19, wherein the paddles are connected to the slideable part.

22. The apparatus of claim 1, wherein the outlet is provided in a lowest part, at least in use, of the foaming chamber.

23. The apparatus of claim 17, wherein the drive shaft, at least in use, extends substantially in vertical direction.

24. The apparatus of claim 17, wherein the quality and/or quantity of foam formed, in use, in the foaming chamber is adjustable by varying the axial position of the paddles relative to the drive shaft.

25. The apparatus of claim 17, wherein the foaming chamber tapers in the flow direction towards the outlet while the stirrer is positioned in the foaming chamber such that, in use, when the stirrer rotates sufficiently rapidly, as a result of centrifugal forces, the beverage flows in the direction of the tapering wall.

26. The apparatus of claim 1, wherein the apparatus is further provided with at least one beverage unit for supplying the beverage or the ingredients of the beverage to the foaming chamber.

27. The apparatus of claim 26, wherein a flow path from the beverage unit to the outlet is designed to be closed off from the environment.

28. The apparatus of claim 1, wherein the apparatus is provided with two outlets which are each in connection with the foaming chamber and which are each provided with a dosing unit.

29. The apparatus of claim 1, wherein the apparatus is provided with at least two foaming chambers and at least two outlets, each outlet being in fluid communication with one of the foaming chamber, each foaming chamber being in fluid communication with at least one of the outlets which are each connected to at least one outlet while each outlet is provided with one of the dosing units.

* * * * *